United States Patent
Pinho et al.

(10) Patent No.: US 7,507,329 B2
(45) Date of Patent: Mar. 24, 2009

(54) PROCESS FOR REDUCING THE NAPHTHENIC ACIDITY OF PETROLEUM OILS OR THEIR FRACTIONS

(75) Inventors: Andrea de Rezende Pinho, Rio de Janeiro (BR); Raquel Campos Cauby Coutinho, Rio de Janeiro (BR); Mauri José Baldini Cardoso, Rio de Janeiro (BR); Elizabeth Marques Moreira, Rio de Janeiro (BR); Patricia Suemar Mello Duarte Da Cunha, Rio de Janeiro (BR); Gabriele Poly Alt Pereira Naves, Rio de Janeiro (BR)

(73) Assignee: Petroleo Brasileiro S.A. - Petrobras, Rio de Janeiro (BR)

( * ) Notice: Subject to any disclaimer, the term of this patent is extended or adjusted under 35 U.S.C. 154(b) by 791 days.

(21) Appl. No.: 11/076,010

(22) Filed: Mar. 10, 2005

(65) Prior Publication Data
US 2006/0201855 A1 Sep. 14, 2006

(51) Int. Cl.
*C10G 32/00* (2006.01)
*C10G 32/02* (2006.01)
*C10G 32/04* (2006.01)
*C10G 31/00* (2006.01)

(52) U.S. Cl. .................................. 208/263
(58) Field of Classification Search ............... 208/177, 208/263
See application file for complete search history.

(56) References Cited

U.S. PATENT DOCUMENTS

| | | | |
|---|---|---|---|
| 4,199,440 A | 4/1980 | Verachtert |
| 4,300,995 A | 11/1981 | Liotta |
| 4,582,629 A | 4/1986 | Wolf |
| 4,647,366 A | 3/1987 | Edmondson |
| 4,853,119 A | 8/1989 | Wolf et al. |
| 5,182,013 A | 1/1993 | Peterson et al. |
| 5,985,137 A | 11/1999 | Ohsol et al. |
| 6,054,042 A | 4/2000 | Gorbaty et al. |
| 6,190,541 B1 | 2/2001 | Siskin et al. |
| 6,281,328 B1 | 8/2001 | Sartori et al. |
| 6,454,936 B1 | 9/2002 | Varadaraj |
| 2004/0026299 A1 | 2/2004 | Chamberlain Pravia et al. |

FOREIGN PATENT DOCUMENTS

WO    WO 01/79386 A2    10/2001

OTHER PUBLICATIONS

K. Lingzhao et al., Study of Separating Naphthenic Acids from Diesel Fuel by Microwave Irradiation, 3 China Pet. Process. Petrochem. Technol. 45-50 (2004).*

* cited by examiner

*Primary Examiner*—Glenn Caldarola
*Assistant Examiner*—Randy Boyer
(74) *Attorney, Agent, or Firm*—Sughrue Mion, PLLC

(57) ABSTRACT

A process for reducing the naphthenic acidity of petroleum oils or their fractions is described, said process comprising providing a hydrocarbon feed 103/203/303 having between 0.1 and 99 wt % of emulsified/dispersed water in oil, said feed containing salts and a content of naphthenic acids measured as TAN between 0.1 and 10 mg KOH/g oil; directing the said petroleum oil feed and emulsified/dispersed water towards an energy emitter device in the microwave range and submitting said feed 103/203/303 in liquid phase, under pressure between 0.7 and 4.5 MPa at temperatures between 50° C. and 350° C. to the microwave radiation, applied in the range of 1 mm to 30 cm to said feed so that the presence of salts, the applied temperature and the high dielectric constant of the water droplets make that the heat is absorbed on the spot by the water and heat said water preferentially to the oil, while the naphthenic compounds at the interface between the droplets and the oil catch said heat; effecting the decomposition of the carboxylic acids responsible for the naphthenic acidity in the petroleum feed at temperatures around 320° C. and generating $CO_2$; separating with the aid of any known device 106/106'/112/117/208/208'/214/219/310/310'/316/321 any gas phase generated, water and oil; and recovering the hydrocarbon oil stream 108/113/119/210/215/221/312/317/323 having a reduced content in naphthenic acids. The process is designed to be applied to the reduction of naphthenic acids in feeds of petroleum oils and their fractions in the oil production step, in refineries or any industrial installation.

50 Claims, 3 Drawing Sheets

PROCESS FOR REDUCING THE NAPHTHENIC ACIDITY OF PETROLEUM OILS OR THEIR FRACTIONS

FIELD OF THE INVENTION

The present invention relates to a process for reducing the naphthenic acidity of petroleum oils or their fractions, more specifically to a process where the naphthenic acidity is reduced by the contact of said petroleum oils having therein emulsified or dispersed water and salts with an electromagnetic field in the microwave range, in liquid phase, whereby the amount of naphthenic acids in said feed of oils or their fractions is reduced.

BACKGROUND INFORMATION

The production of ever-increasing heavy oils of high naphthenic acidity and high viscosity are a challenge for the petroleum industry. High organic acid-content oils are highly corrosive towards equipment used in their processing.

At present, some mixtures of Brazilian oils have shown themselves more corrosive than those usually refined, making that units, chiefly distillation units, require modifications for installing more resistant materials. Since it is not possible to precisely measure the corrosiveness of each petroleum oil, it is not possible to previously ascertain which material should make up the unit in order to withstand a considerable corrosion rate. The chosen material should be as adequate as possible, since excessive corrosion leads to risks linked to leakages, to the premature substitution of equipment and to production interruptions.

On the other hand, chemically resistant materials such as stainless steel are expensive, which is reflected on the overall unit cost as well as on the invested capital return.

The reduction of naphthenic acidity, besides avoiding the problems associated to corrosion, improves the efficiency of the desalting unit/electrostatic treater, one of the most important equipment in production or refining units.

The wrong operation of this equipment or the low efficiency of such treatment causes serious damage to the process units, limiting the campaign period and increasing the processing cost, the main consequences of it being:

a) Equipment corrosion, the more heavily affected in fractioning units being top condensers, top region internals, pipes, control valves, top vessel and the tower wall itself;

b) Salt deposition in exchangers and furnaces, since for many of them solubility is reduced with temperature increase, and/or there is water vaporization with salt precipitation; as a consequence, there is an increase in feed loss in the pre-heating battery, lower thermal exchange efficiency, causing increase in fuel utilization in the furnaces, and also contributing to coke deposition within the furnace tubes and to feed limitation of the unit;

c) Excess water in the process stream, with increased fuel consumption for heating and vaporizing it, besides process instability due to water pockets;

d) Increased chemical product utilization for pH control and corrosion inhibitors, besides making more difficult the control for such products addition due to instability of chloride contents, which makes the additions some times excessive, and some times insufficient;

e) Presence of salts, sediments and solids causing catalyst poisoning and worsening the fuel oil or asphalt quality.

Among the several approaches already adopted for reducing the naphthenic acidity of petroleum oils and their fractions are the use of mixtures of oils of different acidity levels, corrosion inhibitors, thermal treatments and hydrotreatment.

In the case of thermal treatment, Examples cited in U.S. Pat. No. 6,086,751 point out to 90% reductions in TAN (Total Acid Number) for some Venezuelan crudes. The crude is at first submitted to a flash for removing water and thereafter the effluent is submitted to temperatures between 340° C. and 420° C., at pressures lower than 7.5 MPa and reaction times up to 2 hours. Under conditions of conventional visbreaking the reduction reaches 80%. This alternative implies equipment expenditure, such as furnaces and soaker vessels.

A further way of naphthenic acidity reduction is to hydrotreat petroleum under mild conditions. However, the unit campaign period can be limited by catalyst contamination and hydrogen consumption is high at the end, which adds cost to refining.

Another alternative is the esterification of the naphthenic acids through alcohol addition, with or without catalysts. However, this route requires high alcohol expenditure, with increased cost.

The application of corrosion inhibitors is another solution adopted to by-pass the acidity problem. Thus, U.S. Pat. No. 5,182,013 teaches that organic polysulfides are effective inhibitors of corrosion caused by naphthenic acids in refinery distillation units.

U.S. Pat. No. 4,647,366 teaches the addition of oil soluble products of an alkynediol and an polyalkylene polyamine as naphthenic corrosion inhibitors.

Acidity reduction can still be obtained through the treatment of oil with basic NaOH or KOH solutions as taught in U.S. Pat. No. 4,199,440. However this approach demands the use of rather concentrated basic solutions and a critical point is the formation of emulsions difficult to separate. Therefore this solution would be applicable only for low base concentrations.

To by-pass the emulsion problem, U.S. Pat. No. 6,054,042 teaches a treatment with an overbased detergent containing at least 3% calcium wherein the overbased detergent is selected from the group consisting of calcium sulfonates and phenates. Oil is treated at temperatures between 100° C. up to 170° C., the amount of overbased detergent being from 0.025:1 to 10:1 moles of calcium to acidic functionality in the starting crude oil. Amounts of 0.25:1 can also be used.

U.S. Pat. No. 6,258,258 teaches the use of anhydrous ammonia solutions. The proposed treatment can be carried out in two steps, with a first step under conditions of temperature and period of time sufficient to form the ammonium salts of the naphthenic acids and with a second step where the ammonium salts are treated under conditions of temperature and period of time adequate to form the naphthenic acid amides.

U.S. Pat. No. 6,281,328 teaches the use of polymeric amines such as polyvinyl pyridine to solve the problem of naphthenic acidity.

U.S. Pat. No. 4,300,995 teaches the treatment of coal and coal-derived liquids besides vacuum gasoils and petroleum residua showing acidic functionalities with basic solutions of quaternary hydroxides in alcohol or water, such as tetramethyl ammonium hydroxide in a liquid such as alcohol or water.

International publication WO 01/79386 teaches a basic solution containing Groups IA, IIA and ammonium hydroxides and the application of a transfer agent, such as non basic quaternary salts and polyethers to solve the problem of naphthenic acid reduction.

In U.S. Pat. No. 6,190,541 the hydroxide and/or phosphate bases are used with an alcohol for the desired reduction in the naphthenic acid content.

In U.S. Pat. No. 5,985,137, naphthenic acidity and the sulfur content of the oil are reduced by reaction with alkaline earth metal oxides yielding neutralized compounds and alkaline earth metal sulfides. The temperature should be higher than 150° C. for the removal of the carboxylic acids and higher than 200° C. for forming sulfide salts. The applied pressure should keep the material in a non-vaporized state.

Broadly, most of the methodologies used for reducing naphthenic acidity involving thermal treatments without or with the addition of basic solutions, demand the application of surfactants to by-pass the emulsion problem.

A still different approach is the use of adsorbents for adsorbing the naphthenic acids.

Thus Brazilian application PI 0202552-3 of the Applicant teaches the reduction of naphthenic acidity of petroleum oils or their fractions that have been previously submitted to desalting and dehydration through a process that comprises the steps of: a) contacting the naphthenic acid—containing oils or their fractions with an adsorbent, at a ratio of adsorbent/petroleum oil or its fractions in the range of 0.1 to 5, at temperatures between 200° C. and 500° C., under pressures between 0.01 to 0.3 MPag and residence time between 1 second and 2 hours, in order to carry out the desired reduction in naphthenic acidity and obtaining a treated feed; b) on the so-obtained treated feed, separating the spent adsorbent from the petroleum oil or its fractions so as to obtain a treated and separated feed of reduced naphthenic acidity; and c) directing the treated and separated feed for further treatment. The adsorbent used in said Brazilian application is a high specific area material, between 100 and 200 m$^2$/g, the surface of said material being covered with a layer of high molecular weight carbon compounds. Useful adsorbent compounds are carbon black, FCC spent catalysts and coked FCC catalyst.

U.S. Pat. Nos. 4,582,629 and 4,853,119 propose the use of microwaves for emulsion breaking. However, there is no description nor suggestion in these patents as for the removal or reduction of naphthenic acidity.

U.S. Pat. No. 6,454,936B1 teaches the reduction of the amount of naphthenic acids contained in oils by forming an oil/water (O/W) emulsion and using solids. The oil is at first treated with between 0.1 to 5 wt % based on the weight of oil, of a solid able to adsorb the acids present in the oil. Useful solids are silica, alumina, coke, montmorillonite, bentonite, kaolinite and the like. The solids should be of an amphiphilic nature, that is, show a hydrophilic/lipophilic character. The solids are added of 5 to 30 wt % of water based on the amount of oil, at temperatures between 20 to 220° C., the preferred range being 25° C. to 80° C., for 3 to 30 minutes, under pressure between 413.7 kPa up to 6,895 kPa. Water is then added to form an emulsion and separated in a plurality of layers. Separation can be effected through any well-known process such as centrifugation, gravity decantation, hydrocyclones, microwaves, electrostatic separation and combinations of these methods.

In spite of the fact that U.S. Pat. No. 6,454,936B1 mentions the use of microwaves for separating the emulsion, the object of the technology taught therein is not the use of microwave for reducing the naphthenic acid content of the oil, it being restricted to the emulsion separation. It is the solid added to oil before forming the emulsion that is designed to adsorb the naphthenic acids, as pointed out in column 3, line 2 of the cited patent. Since naphthenic acids are of amphiphilic character, the amphiphilic solid will easily adsorb the naphthenic acids.

In spite of the good results related to the naphthenic acid reduction using solid adsorbents reported in the literature, a drawback of this technology is the introduction of an additional separation step for separating the solid adsorbent. Besides, the mere fact of adding to the feed to be treated a foreign material—the adsorbent solid—means cost and trouble to the system. A further drawback is that adsorbents are most of the time used under severe temperature and pressure conditions, these entailing increased cost.

Another relevant and unexpected aspect of the invention, not described nor suggested in the literature is that state-of-the-art processes must submit the overall feed to the proposed treatment, for example, to heating, for a certain residence time, which in general terms is of one hour. Advantageously, in the invention the required energy is used to heat only a fraction of the feed (that is, the droplet emulsified or dispersed in the hydrocarbon phase), for a residence time lower than that required in known processes.

Without being linked to any particular theory, the Applicant hypothesizes that a further advantage of the invention lies in the fact that the naphthenic compounds where the chain shows a reduced number of carbon atoms, being relatively more polar and of higher acid strength than longer or more complex chain analogous compounds, will have more affinity and will concentrate at the interface of the aqueous phase, this allowing higher effectiveness of the intended reduction.

Thus, it can be seen that in spite of the technical developments in this field the technique still needs a process for reducing the naphthenic acid content of petroleum oils and their fractions, said process involving the treatment of said feeds, in the desalting or dehydration steps, with electromagnetic energy in the microwave range, in liquid phase, at temperatures between 50° C. and 350° C., with separation of any formed gas phase, such process being described and claimed in the present application.

SUMMARY OF THE INVENTION

Broadly, the present invention relates to a process for reducing the content of naphthenic acids from a feed of petroleum oil or its fractions, said process comprising:

a) providing a feed of petroleum oil or its fractions having between 0.1 and 99 wt % of emulsified/dispersed water in said oil, said feed containing salts and a content of naphthenic acids measured as TAN between 0.1 and 10 mg KOH/g of oil;

b) directing the feed of petroleum oil or its fractions with emulsified/dispersed water towards an energy-emitting device in the range of microwaves and submitting said feed to said microwave energy, in liquid phase, under pressure of between 0.7 and 4.5 MPa at temperatures between 50° C. and 350° C., the microwave energy being applied in the range of 1 mm to 30 cm to said hydrocarbon feed, so that the presence of salts, the applied temperature and the high dielectric constant of the water droplets make that the heat is adsorbed by water on the spot and heat preferentially the water instead of oil, while the naphthenic compounds at the interface between said droplets and oil catch said heat;

c) decomposing the content of carboxylic acids responsible for the naphthenic acidity in the petroleum oil or its fractions at temperatures around 320° C. so as to generate $CO_2$;

d) by means of any well-known device, separating any formed gas phase, water and oil;

e) recovering the stream of petroleum oil or its fractions having a reduced content in naphthenic acid content; and wherein
   i) The feed of petroleum oil or its fractions is free from any added solid;
   ii) The trend of the naphthenic acids to migrate towards the emulsified phase so as to concentrate said acids in a fraction of the total feed allows the application of the microwave radiation to a feed fraction that is smaller than the total feed.

In case a separation device including a microwave radiation emitter is employed, the feed remains under the effect of such radiation for a residence time between 20 seconds and 40 minutes.

In case the radiation emitter is in line, the residence time depends on the project design such as flow rate and pipe diameter.

Therefore, the invention provides a process for reducing the naphthenic acidity of hydrocarbon feeds having emulsified or dispersed water and salts, by applying to said feed energy in the microwave range.

The invention provides also a process for reducing the naphthenic acidity of hydrocarbon feeds having emulsified or dispersed water and salts, where the naphthenic compounds, at the interface between the droplets and the oil, catch on the spot the heat absorbed by the water, so as to be heated preferentially to the oil.

The invention provides further a process for reducing the naphthenic acidity of hydrocarbon feeds having emulsified or dispersed water and salts, which dispenses with solid adsorbents and any other foreign chemical products added to the process.

The invention provides still a process for reducing the naphthenic acidity of hydrocarbon feeds having emulsified or dispersed water and salts, where the use of dilution water is minimized while losses by oil entrained in the brine are reduced, so as to significantly diminish aqueous effluents and improve the quality of same, also reducing refining costs through lower effluent treatment costs, and lower expenses caused by the demand of expensive, corrosion-resistant internal linings of critical equipment prone to naphthenic corrosion.

The invention provides also a process for reducing the naphthenic acidity of hydrocarbon feeds having emulsified or dispersed water and salts, where the trend of migration of the naphthenic acids towards the emulsified phase, by concentrating said acids in a fraction of the total feed makes easier to apply the proposed technique to a fraction that is smaller than the total feed.

BRIEF DESCRIPTION OF THE DRAWINGS

FIG. 1 attached is a schematic flow sheet of a first mode of the inventive process where the microwave radiation is applied in the phase separation step.

FIG. 2 attached is a schematic flow sheet of a second mode of the inventive process where the microwave radiation is applied in line, following a mixing device and preceding a phase separation device.

FIG. 3 attached is a schematic flow sheet of a third mode of the inventive process where the microwave radiation is applied only on the residual emulsion after a first water and oil separation step.

DETAILED DESCRIPTION OF THE PREFERRED MODES

Figure 1A:
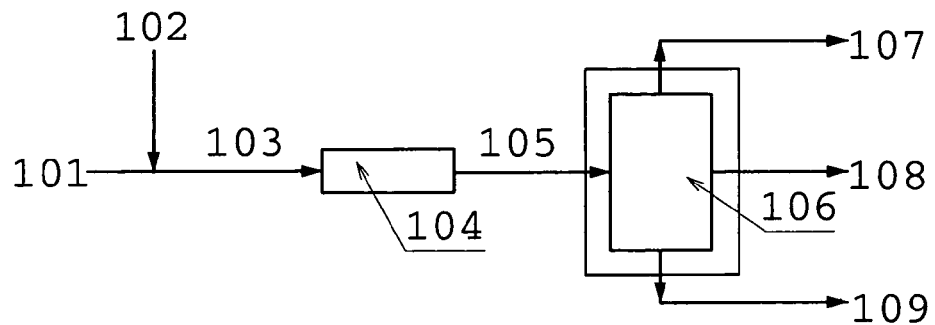
FIG. 1A shows a process configuration with three-phase separation of a gas phase, an oil phase and an aqueous phase.

For the purposes of the invention, the expression "naphthenic acids" mean naphthenic carboxylic acids, or naphthenic-aromatic acids.

The naphthenic acid species removed with the aid of the inventive process are monobasic carboxylic acids of general formula RCOOH, where R is the naphthenic moiety. Naphthenic acids are predominantly made up of alkyl-substituted cycloaliphatic carboxylic acids with minor amounts of non-cycloaliphatic acids. As minor components, aromatic, olefin, hydroxyl and dibasic acids can be present. The molecular weight of the naphthenic acids present in crudes, as determined by mass spectrometry, varies in the range of 200-700.

The process of naphthenic acidity reduction of petroleum oils or their fractions according to the invention is applicable to production facilities. In this case the petroleum oil already contains water, that is, production or connate water.

The process is equally applicable to refineries or to any industrial installation.

The feed to be treated according to the present process can contain solids of natural occurrence present in this kind of feed and processes. Typical solids are mud, slurry, sand, silica, coke or corrosion residue. However, the addition of such solids will not be intentional.

Petroleum oil reaches the refinery having approximately 1% emulsified water. Such water has a certain amount of solids, which are removed through desalting. Upstream of the desalting unit, a further amount of water is added to the emulsion/dispersion so as to dilute the salt concentration in the aqueous phase and such emulsion/dispersion is submitted to an electric field, which causes the formation of a dipole in the droplets, favoring their coalescence and consequent sedimentation.

Water can be emulsified or dispersed in the petroleum feed. Water for forming the emulsion can be effluent from other processes, including other components such as ammonia, chloride, sulfides, phenol and sodium hydroxide of pH in the range of 5-14, more preferably in the range of 10-11.

Water strongly absorbs the microwave range radiation, defined as the radiation range extending between 1,000 MHz and 300,000 MHz. One way of assessing the absorption ability of microwave radiation by a certain material is to determine its dielectric properties. The loss factor or loss tangent provides a fairly good indication as to how much material can be penetrated by an electric field and dissipate such energy as heat.

It is well known that the presence of salts aids in the absorption of the microwave energy and makes easier to turn it into heat, since the loss factor of an aqueous solution with 5% NaCl is six times larger than the same factor for pure water. Besides, while for pure water such factor is reduced with temperature increase, it increases significantly when the water has a high salt content. On the other hand, petroleum oil absorbs only a very small amount of the applied microwave radiation.

Compounds responsible for the naphthenic acidity show surfactant properties, this contributing to stabilize emulsions. The migration of naphthenic acids and asphaltenes towards the oil/water interface has been studied and many times proved, according to the article by J. Sjöblom et al., "Our Current understanding of water-in-crude oil emulsions. Recent characterization techniques and high pressure performance." Advances in Colloid and Interface Science 100-102, 399-473 (2003). The film formed around the water drops dispersed in the oil is then rich in naphthenic acids and asphaltenes.

The application of microwave radiation in emulsified water preferentially heats the water. According to the inventive concept, naphthenic compounds at the interface between the water drop and the oil get the heat absorbed by water on the spot, being heated preferentially to the oil.

Carboxylic acids causing naphthenic acidity are decomposed at temperatures around 320° C. with $CO_2$ generation. The application of microwave radiation in a pressurized ambient able to keep the droplets in emulsion at high temperatures allow the decomposition of the carboxylic acid and $CO_2$ release, reducing naphthenic acidity.

Studies by Horeis et al.—Fifth International Electronic Conference on Synthetic Organic Chemistry, 2001 have shown that organic reactions can occur more quickly when microwave range energy is used than when other means are used for heating. The heating by microwave radiation is more uniform, since it is not influenced by the limitations of conductive or convective processes or by the high viscosity features of petroleum oil.

According to the invention, the petroleum oil feed contaminated with a content of naphthenic acids is a raw petroleum oil feed at the desalting or dehydration step or immediately before such steps.

The petroleum oil feed can be made up of petroleum oils, blends of such oils, residual emulsions of other separation processes, processing residues or a mixture of them combined in any amount.

Alternatively, the feed is a petroleum oil fraction, alone or combined in any amount.

Still alternatively, the feed is a mixture of petroleum oils or blend of petroleum oils with a petroleum fraction, alone or combined to other fractions in any amount.

The content of naphthenic acids in the petroleum oil feed emulsified with water and in the presence of salts can reach up to 10 mg KOH/g of oil. A typical range is between 0.5 and 3 mg KOH/g of oil.

The required power by gallon of oil to be treated is from 1 to 500 W.

Process pressures are in the range of 0.7 to 4.5 MPa, securing that the salt water will not go into the gas state.

Typical process temperatures are between 50° C. and 350° C.

When a microwave radiation emitter is contained in a separation device, the residence times of the feed to be treated are typically in the range of 20 seconds to 40 minutes.

For a microwave radiation emitter in line, that is, the microwave radiation emitter is an equipment independent of any phase separation device, the residence time depends on process parameters such as feed flow rate and pipe diameter.

When the present process is applied in production facilities, there is no water addition for diluting the salt concentrations, as represented in the Figures by numerals 102, 202 and 302, as well as the mixing device 104, 204 and 304 for forming emulsified/dispersed water is dispensed with. Thus, for the process in production facilities the feed should be considered as being equivalent to streams 105, 205 and 305.

Whenever the process is designed for a refinery, the mixing device, hereinafter designed by numeral 104, is any device able to cause a whirling in the feed. A typical mixing device is a valve. Another useful mixing device is a static mixer.

According to the mode of the invention depicted in FIG. 1, the microwave radiation emitter is contained in a device hereinafter designed by numeral 106. Such device is designed not only to submit the feed of petroleum oil or its fractions to contact with the microwave energy, but also to separate the water, oil and gas phases. Device 106 can be designed according to several configurations such as vessels provided or not with internal coalescing devices, if larger phase separation is desired. In this way, if downstream of device 106 (see FIG. 1A) there are no other devices to aid in phase separation, the interior of device 106 should include means for facilitating phase separation, such as coalescing devices.

Alternatively, other configurations are possible, for example, the presence of internal electrodes in device 106 for generating an electrostatic field.

Phase separation carried out in device 106 can be complemented downstream by centrifugation, gravitational separation, ultra sound, hydrocyclones, electrostatic separation, filtration, membrane separation or a combination of these techniques.

Alternatively the microwave radiation emitter is placed in line with the mixing device, according to the process configuration depicted in FIG. 2.

As practiced in the technique, the addition of a demulsifier also belongs to the present process. Such addition can be done before, during or after applying the microwave radiation, in the phase separations step.

Microwave radiation is applied in the range of 1 mm to 30 cm to any petroleum oil feed with emulsified or dispersed water and salts. Thus, the petroleum oil feed can be supplied by a petroleum fraction or by raw, as-produced petroleum oil from a production facility.

The invention will now be described in more detail by reference to the attached Figures.

The flow sheet of FIG. 1 depicts in a schematic way a first mode of the inventive process where the microwave radiation is applied during the phase separation step.

FIG. 1A shows a process configuration with separation of a gas phase, an oil phase and an aqueous phase in one single device, designed by numeral 106.

Useful separation devices or separators useful in the practice of the invention are three-phase or two-phase separators commonly used in the technique.

In FIG. 1A, feed stream 101 is added of water stream 102 in a concentration of at least 3% vol/vol, with a typical range between 5 and 10% vol/vol, yielding stream 103 directed to in-line mixing device 104 so as to obtain water-in-oil emulsion/dispersion 105. Said emulsion/dispersion 105 is then directed to device 106 designed to phase separation and which also contains a microwave radiation emitter of 1,000 MHz to 300,000 MHz capacity, the application of microwave radiation in dispersed or emulsified water heating preferentially said water, whereby the naphthenic compounds at the interface between the water drop and the oil catch on the spot the heat absorbed by the water, and are heated preferentially to oil. Carboxylic acids, which cause naphthenic acidity, are decomposed at temperatures around 320° C., yielding $CO_2$. The application of microwave radiation in a pressurized environment able to keep the droplets in a state of emulsion or dispersion at high temperatures, allows the decomposition of the carboxylic acid and $CO_2$ release, reducing naphthenic acidity.

The residence time in device 106 is between 20 seconds up to 40 minutes. In FIG. 1A, in device 106 there is three-phase separation of the gas 107, organic 108 and aqueous 109 streams. Stream 107 refers to a $CO_2$-rich gas stream resulting from the carboxylic acid degradation of the feed, besides light hydrocarbons. Stream 107 can be combined in a collector to the relief streams or directed to any other destination.

Stream 108 represents an organic hydrocarbon stream having a reduced content in naphthenic acids, that is, the desired product resulting from the microwave radiation treatment. Said stream can contain a minor amount of water, entrained solids and dissolved gases such as $CO_2$. When the process is applied to a production step, stream 108 takes the usual route of petroleum production. While if the process is used in a refinery, stream 108 is directed to further fractioning.

Both for the application in production facilities as well as in refineries, according to the initial naphthenic acid content of stream 101, the remaining naphthenic acid content in product stream 108 is tested by analysis. According to the remaining content, a new naphthenic acid removal cycle can be considered. When applied to a refinery, stream 108 can be added of a further water stream equivalent to stream 102, having the same or a different amount of water based on the feed, the water being or not from the same source, so as to create, in series, a new mixing modulus, microwave radiation application and phase separation.

According to the required severity, the process conditions of this new cycle can be the same or different from those practiced in the first cycle. It is still possible to consider a third treating stage, according to the salt and naphthenic acid content present in feed 101.

It should be understood that in spite of the fact that product stream 108 is represented as a side withdrawal from device 106, the configuration adopted for such withdrawal is not critical and depends on the specific features of device 106.

Stream 109 stands for an aqueous stream effluent from device 106, made up of water from feed stream 103 but which can also contain a minor amount of hydrocarbons, entrained solids and dissolved gases such as $CO_2$. Stream 109 is discarded off or recycled to the process.

Figure 1B:
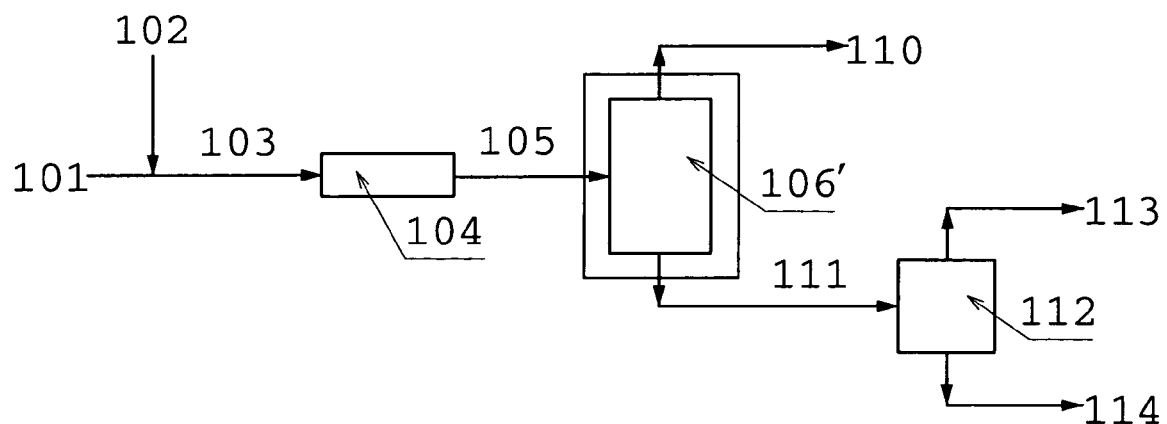
FIG. 1B shows a process configuration with the separation of a gas phase and a liquid water/oil phase.

In FIG. 1B, in device 106' there is a two-phase separation.

In FIG. 1B, streams and devices 101 to 105 have the same meanings as in FIG. 1A.

After submitting stream 105 to microwave radiation, the phase separation in device 106' for two-phase separation is as follows. Stream 110 represents a gas stream, the destination and composition of which are analogous to gas stream 107. Stream 111 stands for a liquid hydrocarbon and water stream, which can also entrain a minor amount of solids and dissolved gases. Stream 111 is directed to any separation device 112, where it is separated into a hydrocarbon-rich organic stream 113—the product stream—and an aqueous stream 114. Procedures described for streams 108 and 109 can also be applied to streams 113 and 114.

Figure 1C:
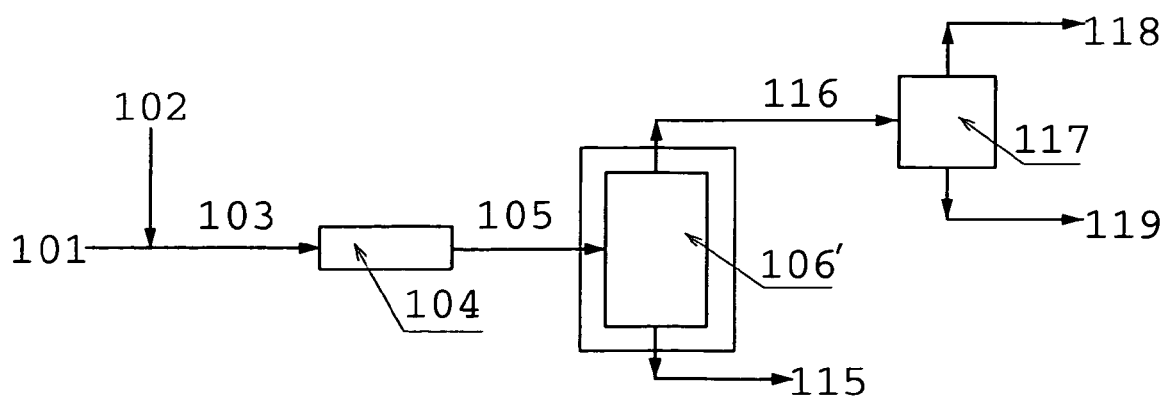
FIG. 1C shows a process configuration with separation of a gas and oil stream from an aqueous phase.

In FIG. 1C, in device 106' there is a two-phase separation.

In FIG. 1C, streams and devices 101 to 105 have the same meanings than in FIGS. 1A and 1B.

After submitting stream 105 to microwave radiation, the phase separation in device 106' is as follows. Stream 115 stands for an aqueous stream the destination and composition of which are analogous to aqueous stream 109. Stream 116 stands for a gas and hydrocarbon stream, which can also entrain a small amount of water. Stream 116 is directed to any separation device 117, where it is separated into a hydrocarbon-rich organic stream 119—product stream—and a gas stream 118.

The described procedures for streams 108 and 109 can equally be applied to streams 119 and 115.

FIG. 2 illustrates a second mode of the inventive process where the microwave radiation emitter is placed in line, downstream to the mixing device and upstream of a separation device.

Figure 2A:
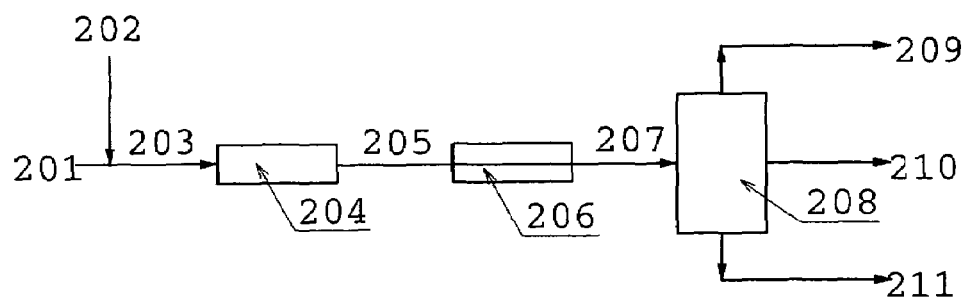
FIG. 2A shows a process configuration with three-phase separation of a gas phase, an oil phase and an aqueous phase.

FIG. 2A depicts a process configuration with three-phase separation of a gas phase, an oil phase and an aqueous phase.

In FIG. 2A, there is separation of a gas phase, an oil phase and an aqueous phase in one single device indicated by numeral 208.

In FIG. 2A feed stream 201 is added of stream 202 of water in a concentration of at least 3% vol/vol, with a typical range between 5 and 10% vol/vol, obtaining stream 203 directed to the in-line mixing device 204, forming the water-in-oil emulsion/dispersion 205. Emulsion/dispersion 205 is directed to device 206 containing a microwave radiation emitter in the range of 1,000 MHz to 300,000 MHz where the water of the emulsion/dispersion will be preferentially heated, whereby the naphthenic compounds at the interface between the drop and the oil catch on the spot the heat absorbed by water and are heated preferentially to oil. The pressurized ambient keeps the droplets in emulsion/dispersion at high temperatures and allow the decomposition of the carboxylic acid and $CO_2$ release, reducing naphthenic acidity. A stream 207 containing hydrocarbon of reduced content in naphthenic acids is then directed to the three-phase separation device 208 for phase separation.

In FIG. 2A the phase separation is similar to that described for FIG. 1A, with the three-phase separation device being indicated by numeral 208 and streams 209, 210 and 211 indicating respectively a gas stream, a product hydrocarbon stream that can contain a minor amount of water, entrained solids and dissolved gases such as $CO_2$, and a stream mainly made up of water but which can also contain a minor amount of hydrocarbons, entrained solids and dissolved gases such as $CO_2$.

Figure 2B:
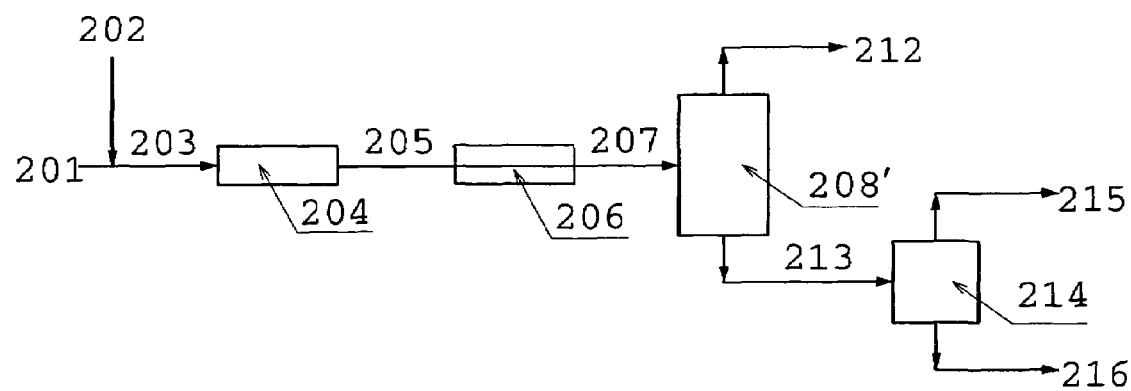
FIG. 2B shows a process configuration with separation of a gas phase and a liquid water/oil phase.

FIG. 2B shows a process configuration with the separation of a gas phase and a liquid water/oil phase.

In FIG. 2B, in device 208' there is a two-phase separation.

In FIG. 2B, streams and devices 201 to 207 have the same meanings than in FIG. 2A.

In the same way, streams 212 and 213 correspond respectively to streams 110 and 111 of FIG. 1B. Stream 213, rich in hydrocarbons and water, is directed to any two-phase separation device 214, where is separated a product stream 215 analogous to stream 113, and an aqueous stream 216 analogous to stream 114.

The procedures related to one or further treatment cycles for reducing the naphthenic acid content described for streams 108/113 and 109/114 can equally be applied to streams 215 and 216.

Figure 2C:
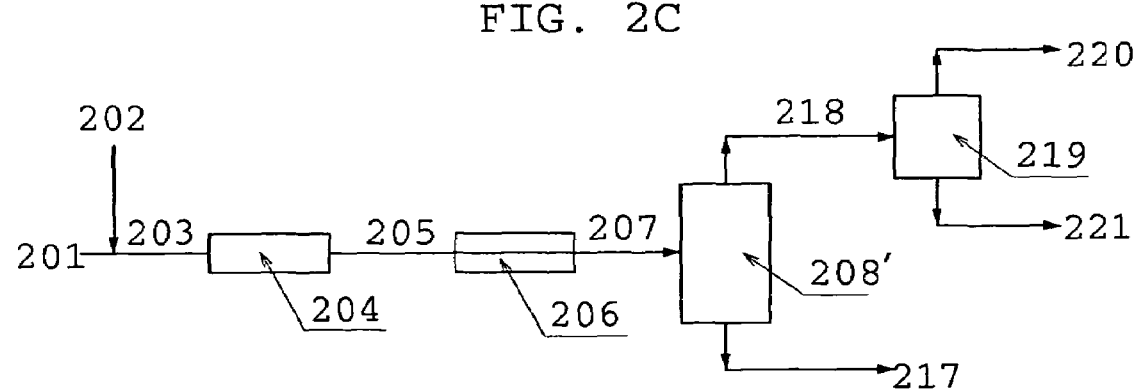
FIG. 2C shows a process configuration with separation of a gas and oil stream from an aqueous phase.

FIG. 2C shows a process configuration with the separation of a gas and oil stream from an aqueous phase.

In FIG. 2C, the streams and devices 201 to 207 have the same meanings as in FIGS. 2A and 2B.

From two-phase separation 208' is obtained a gas and oil stream 218 analogous to stream 116 of FIG. 1C, said stream being directed to a separator 219. Stream 217 stands for an aqueous stream the destination and composition of which are analogous to aqueous stream 109/115.

Liquid hydrocarbon stream 218 can also entrain a minor amount of water, solids and dissolved gases. Stream 218 is directed to any separation device 219, where it is separated into a hydrocarbon-rich organic stream 221—product stream—and a gas stream 220.

The procedures related to one or more further treatment cycles for reducing the naphthenic acids described for streams 119 and 115 can be applied respectively to streams 221 and 217.

Figure 3A:
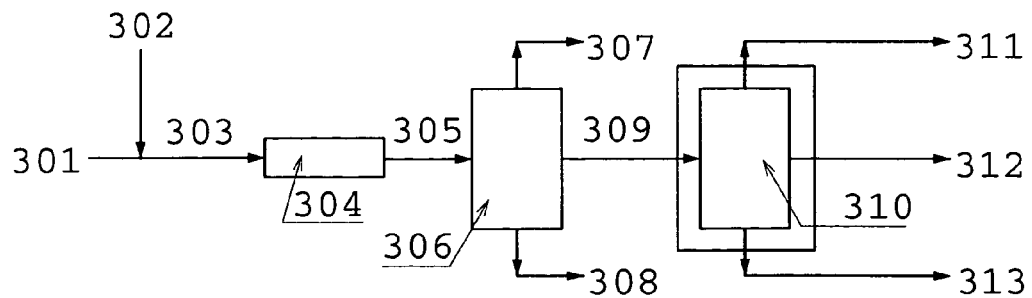
FIG. 3A shows a process configuration with three-phase separation of a gas phase, an oil phase and an aqueous phase.

FIG. 3 illustrates a third mode of the inventive process where the microwave radiation is applied only in the residual emulsion phase after a first water and oil separation step FIG. 3A depicts a process configuration with three-phase separation of a gas phase, an oil phase and an aqueous phase.

According to FIG. 3A, feed stream 301 is added of water stream 302 at a concentration of at least 3% vol/vol, with a typical range between 5 and 10% vol/vol, forming stream 303 directed to in line mixing device 304, forming the water-in-oil emulsion/dispersion 305, said emulsion/dispersion being directed towards any phase separation device 306.

In device 306 are separated a water-rich stream 308 which can contain a minor amount of entrained solids and hydrocarbons, a hydrocarbon stream 307 which can contain a minor amount of water and entrained solids and a residual emulsion stream 309, directed to device 310, a three-phase separator including in its interior a microwave radiation emitter in the range of 1,000 MHz to 300,000 MHz, where the said residual emulsion stream 309 will be submitted to microwave radiation, whereby water of the emulsion/dispersion will be preferentially heated, for a residence time between 20 seconds and 40 minutes, whereby the naphthenic compounds at the interface between the drop and the oil catch on the spot the heat absorbed by the water, being heated preferentially to oil. At the same time, the ambient pressurized between 0.7 and 4.5 MPa keeps the emulsion/dispersion droplets at high temperatures allowing decomposition of the carboxylic acid and $CO_2$ release, so as to reduce naphthenic acidity.

Carboxylic acids that cause naphthenic acidity are decomposed through the microwave radiation, at temperatures around 320° C. and generating $CO_2$.

After the residence time required for reducing the naphthenic acid content, and phase separation in device 310, a stream 312 of hydrocarbon product and streams 311 and 313 analogous to streams 107 and 109 of FIG. 1A are recovered.

Figure 3B:
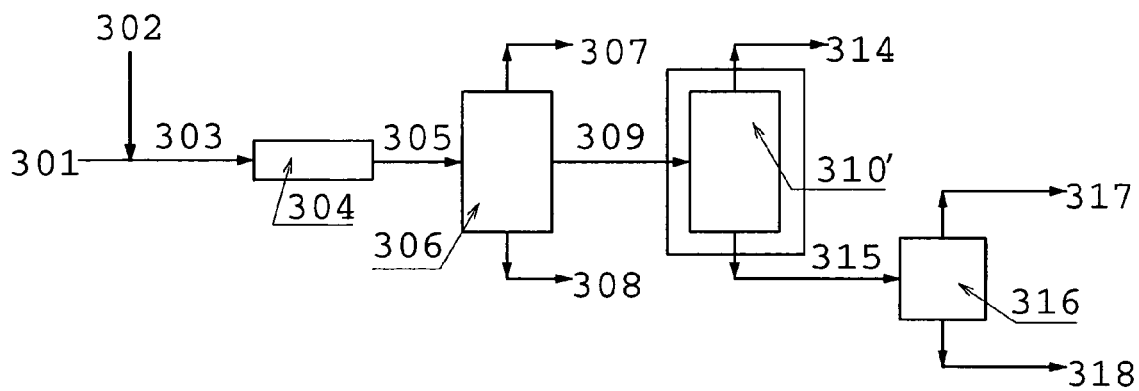
FIG. 3B shows a process configuration with separation of a gas phase and a liquid water/oil phase.

FIG. 3B depicts a process configuration with separation of a gas phase and a liquid water/oil phase.

In FIG. 3B streams 301 to 309 are as in FIG. 3A.

Separator 310' is a two-phase separator including a microwave radiation emitter. After submitting residual emulsion stream 309 to microwave radiation for the required period of time, are obtained, in a way that is similar to that of FIG. 1B, gas stream 314 corresponding to stream 110 and hydrocarbon and water stream 315, analogous to stream 111. Stream 315 is then directed to a separator 316 analogous to separator 112. Stream 317 is the desired hydrocarbon product stream with reduced content in naphthenic acids and stream 318 is an aqueous stream analogous to stream 114.

The procedures related to one or more further treatment cycles for reducing the naphthenic acid content described for streams 113 and 114 can equally be applied to streams 317 and 318.

Figure 3C:
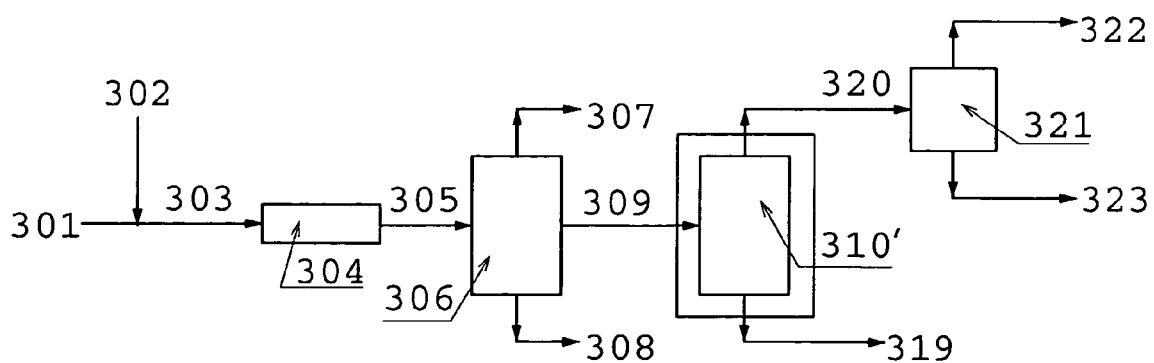
FIG. 3C shows a process configuration with separation of a gas and oil stream from an aqueous phase.

FIG. 3C depicts a process configuration with separation of gas and oil stream from an aqueous phase.

In FIG. 3C streams 301 to 309 are as in FIGS. 3A and 3B.

Residual emulsion stream 309 is directed to separator 310' that includes microwave radiation emitter. After the required period for contact with radiation and consequent reduction of the naphthenic acid content, the separation into an aqueous stream 319 occurs, this stream destination and composition being analogous to that of aqueous streams 109/115. Stream 320 stands for a gas and hydrocarbon stream, which can also entrain a minor amount of water and solids. Stream 320 is directed to any separation device 321, where it is separated into a hydrocarbon-rich organic stream 323—product stream—and a gas stream 322. Procedures related to one or further treatment cycles for reducing the naphthenic acid content described for streams 108/119 and 109/115 can equally be applied to streams 323 and 319.

An alternative process configuration for the invention is that where, due to the nature of the treated feed or to any other reasons, there is no need to provide for any gas phase separation. In this case the separation devices employed in the various configurations will be two-phase devices, and designed for the separation of the oil and water phases.

Advantageous consequences of the application of the present process of naphthenic acid reduction of hydrocarbon feeds include equipment corrosion rates minimization this in turn increasing dependability and risk minimization associated to leakages or emergency production interruption.

Besides, the inventive process reduces the utilization of chemical products for pH control and corrosion inhibitors, as well as the inherent risks associated to said products; it does not require the use of any other foreign raw material, and does not involve the need to discard any hazardous chemical products.

Petroleum oil having a reduced naphthenic acid content obtained by the inventive process allows its utilization dispensing with the metallurgical adaptation of the refining park through the use of high cost special materials.

In spite of the fact that the present process has been described more specifically as related to its application in production and refinery, it is obvious to the experts that the inventive concept can be equally applied to any industrial installation where it is desired to carry out a treatment for the reduction of naphthenic acids present in hydrocarbon feeds.

We claim:

1. A process for reducing the naphthenic acidity of petroleum oils or their fractions, wherein said process comprises:
    a) providing a feed of petroleum oil or its fractions with between 0.1 and 99 wt % of emulsified/dispersed water in oil, said feed containing salts and a content of naphthenic acids measured as TAN between 0.1 and 10 mg KOH/g of oil;
    b) directing said feed of petroleum oil or its fractions with emulsified/dispersed water and salts towards a radiation emitting device in the microwave range and submitting said feed in the liquid phase under pressure between 0.7 and 4.5 MPa at temperatures between 50° C. and 350° C. to said microwave energy, applying said energy in the range of 1 mm to 30 cm on said petroleum feed, so that the presence of salts, the applied temperature and the high dielectric constant of water droplets make that the heat is absorbed on the spot by the water and heat it preferentially to oil, while the naphthenic compounds in the interface between the droplets and the oil receive said heat;
    c) effecting the decomposition of the carboxylic acids responsible for the naphthenic acidity in said feed of petroleum oil or its fractions at temperatures around 320° C., generating $CO_2$;
    d) with the aid of any known separating device, separating any generated gas phase, water and oil;
    e) recovering petroleum oil or its fractions of reduced content in naphthenic acids, and where:
        i) the feed of petroleum oil or its fractions is free from any added solid;

ii) the migration trend of the naphthenic acids towards the emulsified phase, by concentrating said acids in a fraction of the overall feed, allows the application of the microwave radiation to a fraction that is smaller than the total feed.

2. A process according to claim 1, wherein the microwave radiation emitter is included in a phase separation device.

3. A process according to claim 1, wherein the microwave radiation emitter is an equipment independent of any phase separation device.

4. A process according to claim 1, wherein in step d) the phase separation device separates water and oil only.

5. A process according to claim 1, wherein said process comprises the following steps:
   a) combining a feed stream (101) and a water stream (102) at a concentration of at least 3% vol/vol obtaining a stream (103) directed to an in line mixing device (104) so as to form a water-in-oil emulsion/dispersion (105) directed to a device (106), said emulsion/dispersion being kept within said mixing device (106) for a residence time between 20 seconds and 40 minutes, at a temperature between 50° C. and 350° C. under a pressure between 0.7 and 4.5 MPa, in liquid phase, the device (106) being designed for phase separation and also including a microwave radiation emitter of 1,000 MHz to 300,000 MHz, the application of microwave radiation in emulsified water heating preferentially the water, whereby the naphthenic compounds in the interface between the drop and the oil catch on the spot the heat absorbed by water and are heated preferentially to oil;
   b) with the aid of the microwave radiation, decomposing the carboxylic acids responsible for the naphthenic acidity, at temperatures around 320° C. and generating $CO_2$;
   c) effecting the separation of the oil, gas and water streams;
   d) recovering the oil stream with a reduced content in naphthenic acids, and where:
      i) the hydrocarbon stream is free from any added solid;
      ii) the trend to migration exhibited by naphthenic acids towards the emulsified phase, by concentrating said acids in a fraction of the overall feed allows to apply the microwave radiation in a fraction that is smaller than the total feed.

6. A process according to claim 5, wherein the device (106) is a three-phase separator.

7. A process according to claim 6, wherein the separation yields a $CO_2$-rich gas stream (107) generated by the degradation of the carboxylic acids present in the feed, besides light hydrocarbons.

8. A process according to claim 6, wherein the separation yields product stream (108), a hydrocarbon organic stream having a reduced content of naphthenic acids.

9. A process according to claim 6, wherein stream (109) is an aqueous stream directed for discarding or recycled to the process and made up of water from feed stream (103), and a minor amount of hydrocarbons, entrained solids and dissolved gases such as $CO_2$.

10. A process according to claim 5, wherein alternatively feed stream (105) is directed to a two-phase separator (106'), yielding a gaseous stream (110) and a hydrocarbon and water stream (111), said stream (111) being directed to a second two-phase separation device (112) wherefrom are separated a product hydrocarbon stream (113) and an aqueous stream (114).

11. A process according to claim 5, wherein still alternatively the feed stream (105) is directed to a two-phase separator (106') yielding an aqueous stream (115) and a gas and hydrocarbon stream (116) directed to a second two-phase separator (117) where are separated a gas stream (118) and a hydrocarbon product (119) stream.

12. A process according to claim 5, wherein alternatively the process stream is stream (105).

13. A process according to claim 1, wherein said process comprises the following steps:
   a) combining feed stream (201) and water stream (202) at a concentration of at least 3% vol/vol, obtaining stream (203) directed to the in-line mixing device (204) so as to form water-in-oil emulsion/dispersion (205), said emulsion/dispersion (205) being directed to device (206 containing a microwave radiation emitter in the range of 1,000 MHz to 300,000 MHz where the water of the emulsion/dispersion will be preferentially heated, whereby the naphthenic compounds at the interface between the drop and the oil receive on the spot the heat absorbed by water and are heated preferentially to oil, the ambient pressurized between 0.7 and 4.5 MPa, at temperatures between 50° C. and 350° C. keeping the droplets in emulsion and allowing the decomposition of the carboxylic acid and $CO_2$ release so as to reduce naphthenic acidity;
   b) with the aid of the microwave radiation, decomposing carboxylic acids responsible for naphthenic acidity at temperatures around 320° C., generating $CO_2$;
   c) separating the oil, gas and water streams in a phase separator; and
   d) recovering the petroleum oil or its fractions having a reduced naphthenic acid content, and wherein:
      i) The feed of petroleum oil or its fractions is free from any added solid;
      ii) The trend of the naphthenic acids to migrate towards the emulsified phase so as to concentrate said acids in a fraction of the total feed allows the application of the microwave radiation to a fraction that is smaller than the total feed.

14. A process according to claim 3, wherein the residence time of the feed of petroleum oil or its fractions in the microwave radiation emitter (206) varies according to the feed flow rate and the pipe diameter.

15. A process according to claim 13, wherein the oil, gas and water streams are separated in a three-phase separator (208).

16. A process according to claim 13, wherein the separation yields a $CO_2$-rich gas stream generated by the degradation of carboxylic acids present in the feed, besides light hydrocarbons.

17. A process according to claim 13, wherein the separation yields product stream (210), a hydrocarbon organic stream having a reduced content in naphthenic acids.

18. A process according to claim 13, wherein stream (211) is an aqueous stream directed to discarding or recycled to the process and made up of water from feed stream (203), a minor amount of hydrocarbons, entrained solids and dissolved gases such as $CO_2$.

19. A process according to claim 13, wherein alternatively feed stream (205) is directed to a two-phase separator (208') yielding a gas stream (212) and a hydrocarbon and water stream (213) directed to a second two-phase separation device (214) wherefrom are separated a stream (215) of product hydrocarbon and an aqueous stream (216).

20. A process according to claim 13, wherein still alternatively feed stream (205) is directed to a two-phase separator (208') yielding an aqueous stream (217) and a hydrocarbon and gas stream (218) directed to a second two-phase separator (219) where are separated a gas stream (220) and a product hydrocarbon stream (221).

21. A process according to claim 13, wherein alternatively the feed stream is stream (205).

22. A process according to claim 5, wherein in step c) the phase separation device separates water and oil only.

23. A process according to claim 1, wherein said process comprises the following steps:
   a) combining feed stream (301) with water stream (302) in a concentration of at least 3% vol/vol, obtaining stream (303) directed to in-line mixing device (304) so as to form water-in-oil emulsion/dispersion (305) in turn directed to any phase separation device (306);
   b) in device (306), separating a water stream (308), a hydrocarbon stream (307) and a residual emulsion stream (309);
   c) directing said residual emulsion stream (309) to separator device (310), said separator including in its interior a microwave radiation emitter in the range of 1,000 MHz to 300,000 MHz and submitting the said residual emulsion stream (309) to microwave radiation, whereby the water of the residual emulsion will be preferentially heated, whereby the naphthenic compounds of the drop and oil interface catch on the spot the heat absorbed by water, being heated preferentially to the oil, the pressurized ambient between 0.7 and 4.5 MPa and the temperatures between 50° C. and 350° C. keeping the droplets in emulsion and allowing the carboxylic acid decomposition and $CO_2$ release, so as to reduce naphthenic acidity;
   d) with the aid of the microwave radiation, decomposing the carboxylic acids responsible for the naphthenic acidity at temperatures around 320° C., so as to generate $CO_2$;
   e) separating the oil, gas and water streams in a phase separator; and
   f) recovering petroleum oil or its fractions having a reduced content in naphthenic acids; and wherein:
      i) the feed of petroleum oil or its fractions is free from any added solid;
      ii) the migration trend of the naphthenic acids towards the emulsified phase, by concentrating said acids in a fraction of the overall feed, allows the application of the microwave radiation to a fraction that is smaller than the total feed.

24. A process according to claim 2, wherein the residence time of the feed of petroleum oil or its fractions in the microwave radiation emitter varies between 20 seconds and 40 minutes.

25. A process according to claim 5, wherein the water concentration of stream (102/202/302) combined to stream (101/201/301) is between 5 and 10% vol/vol.

26. A process according to claim 23, wherein the separation yields a $CO_2$-rich gas stream (311) generated by the carboxylic acids present in the feed, besides light hydrocarbons.

27. A process according to claim 23, wherein the separation yields product stream (312), a hydrocarbon organic stream having a reduced content in naphthenic acids.

28. A process according to claim 23, wherein stream (313) is an aqueous stream to be either discarded or recycled to the process and made up of water from feed stream (303), a minor amount of hydrocarbons, entrained solids and dissolved gases such as $CO_2$.

29. A process according to claim 23, wherein alternatively residual emulsion stream (309) is directed to a two-phase separator (310') yielding a gas stream (314) and a water and hydrocarbon stream (315), directed to a second two-phase separation device (316) wherefrom are separated a product hydrocarbon stream (317) and an aqueous stream (318).

30. A process according to claim 23, wherein still alternatively residual emulsion stream (309) is directed to a two-phase separator (310') yielding an aqueous stream (319) and a gas and hydrocarbon stream (320) directed to a second two-phase separator (321) wherefrom are separated a gas stream (322) and a product hydrocarbon stream (323).

31. A process according to claim 23, wherein alternatively the process feed is stream (305).

32. A process according to claim 23, wherein in step e), the phase separation device separates water and oil only.

33. A process according to claim 1, wherein the pH of the emulsified/dispersed water in the feed of petroleum oil or its fractions is between 5 and 14.

34. A process according to claim 33, wherein the pH of the emulsified/dispersed water in the feed of petroleum oil or its fractions is between 10 and 11.

35. A process according to claims 33, wherein further the emulsified/dispersed water in the feed of petroleum oil or its fractions contains phenols, chlorides, sulfide, ammonia and sodium hydroxide.

36. A process according to claim 1, wherein said process is designed to be applied to petroleum production.

37. A process according to claim 1, wherein said process is designed to be applied in refineries.

38. A process according to claim 1, wherein said process is designed to be applied in any industrial installation.

39. A process according to claim 1, wherein the feed of petroleum oil or its fractions is a crude or a petroleum blend.

40. A process according to claim 1, wherein the feed of petroleum oil or its fractions is a petroleum fraction, alone or combined to other fractions in any amount.

41. A process according to claim 1, wherein the feed of petroleum oil or its fractions is a crude or a petroleum blend combined to a petroleum fraction, alone or combined to other fractions in any amount.

42. A process according to claim 1, wherein the feed of petroleum oil or its fractions is a residue from petroleum processing.

43. A process according to claim 1, wherein the naphthenic acid content of the feed measured as TAN is between 0.5 and 3 mg KOH/g oil.

44. A process according to claim 1, wherein it further includes a demulsifier.

45. A process according to claim 44, wherein the demulsifier addition is performed before, during or after the application of the microwave radiation, in the phase separation step.

46. A process according to claim 1, wherein further the hydrocarbon product having reduced content of naphthenic acids is analyzed for determining the remaining naphthenic acid content.

47. A process according to claim 46, wherein for higher than desired naphthenic acid contents in the product stream, a new cycle of naphthenic acid removal is carried out, whereby the hydrocarbon stream can be added of a further water stream equivalent to the initial stream utilized to prepare the emulsion/dispersion, with the same or different percent water based on the feed, the water being from the same source or not, so as to create in series a new cycle of mixing process, microwave radiation application and phase separation.

48. A process according to claim 47, wherein, according to the required severity, the process conditions of said further cycle can be the same or different from those practiced in the first cycle.

49. A process according to claim 1, wherein the phase separation carried out in a phase separation device is complemented downstream by centrifugation, gravity separation, ultrasound, hydrocyclones, electrostatic separation, filtration, membrane separation or a combination of these techniques.

50. A process according to claim 13, wherein the microwave radiation emitter is independent of the phase separator.

* * * * *